US007325045B1

(12) United States Patent
Manber et al.

(10) Patent No.: US 7,325,045 B1
(45) Date of Patent: Jan. 29, 2008

(54) ERROR PROCESSING METHODS FOR PROVIDING RESPONSIVE CONTENT TO A USER WHEN A PAGE LOAD ERROR OCCURS

(75) Inventors: Udi Manber, Seattle, WA (US); Lawrence Tesler, Seattle, WA (US); Jonathan Leblang, Menlo Park, CA (US); Jeffrey P. Bezos, Greater Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 851 days.

(21) Appl. No.: 10/634,633

(22) Filed: Aug. 5, 2003

(51) Int. Cl.
G06F 15/16 (2006.01)
G06F 11/00 (2006.01)
(52) U.S. Cl. ........................ 709/219; 709/227; 714/6; 714/48
(58) Field of Classification Search ........ 709/217–219, 709/227–229; 714/48–54, 6
See application file for complete search history.

(56) References Cited

U.S. PATENT DOCUMENTS

| 5,892,919 | A | * | 4/1999 | Nielsen ........................ 709/228 |
| 5,941,944 | A | * | 8/1999 | Messerly ...................... 709/203 |
| 6,061,738 | A | * | 5/2000 | Osaku et al. ................ 709/245 |
| 6,154,738 | A | * | 11/2000 | Call ................................. 707/4 |
| 6,202,087 | B1 | * | 3/2001 | Gadish ........................ 709/206 |
| 6,282,548 | B1 | | 8/2001 | Burner et al. |
| 6,332,158 | B1 | * | 12/2001 | Risley et al. ................ 709/219 |
| 6,549,941 | B1 | | 4/2003 | Jaquith et al. |
| 6,594,697 | B1 | * | 7/2003 | Praitis et al. ................ 709/225 |
| 6,687,734 | B1 | | 2/2004 | Sellink et al. |
| 6,782,430 | B1 | * | 8/2004 | Cragun ........................ 709/245 |
| 6,895,430 | B1 | * | 5/2005 | Schneider ................... 709/217 |
| 6,987,987 | B1 | * | 1/2006 | Vacanti et al. ........... 455/556.2 |
| 7,058,633 | B1 | * | 6/2006 | Gnagy et al. ................. 707/10 |
| 7,162,698 | B2 | * | 1/2007 | Huntington et al. ........ 715/736 |
| 2002/0056053 | A1 | | 5/2002 | Vine et al. |
| 2002/0059396 | A1 | * | 5/2002 | Holzer et al. ............... 709/217 |

(Continued)

OTHER PUBLICATIONS

Plotnikoff, D., "Navigation tools help the Web traveler," 3-page newsletter from San Jose Mercury News, dated Feb. 5, 2000.

(Continued)

Primary Examiner—Joseph E. Avellino
(74) Attorney, Agent, or Firm—Knobbe, Martens, Olson & Bear, LLP

(57) ABSTRACT

A client component runs on a user computer in conjunction with a web browser and detects errors, such as but not limited to "404: page not found" errors, in which a requested web page or other object cannot be displayed. In response to detecting the error, the client component notifies an error processing server, which uses the URL of the failed request to identify an alternate object to display. The alternate object may, for example, be (a) an object retrieved from replacement URL, or from a URL that is otherwise related to the requested object, (b) a cached version of the requested object, (c) an object retrieved from a closely matching URL found in the user's clickstream history, or (d) a dynamically generated page that includes links to one or more of the foregoing types of alternate objects. Also disclosed are methods for identifying alternate objects for a given URL.

44 Claims, 5 Drawing Sheets

U.S. PATENT DOCUMENTS

2002/0083130 A1* 6/2002 Shimada et al. ............ 709/203
2003/0084034 A1* 5/2003 Fannin .......................... 707/3
2004/0107296 A1* 6/2004 Donker et al. .............. 709/245

OTHER PUBLICATIONS 3-page Press Release titled "*Alexa Internet Integrates Related Links and Archive of the Web into Internet Explorer 5 Release*," dated Mar. 18, 1999.

Wexelblat, A., and Maes, P., "*Footprints: History-Rich Tools for Information Foraging*," Proceedings of ACM CHI'99 Conference, ACM Press, May 15-20, 1999.

Wingfield, N., "*Internet Companies See Value In Misaddressed Web Traffic*," The Wall Street Journal, Online as of Friday, Sep. 5, 2003, pp. 1-4.

\* cited by examiner

FIG. 4

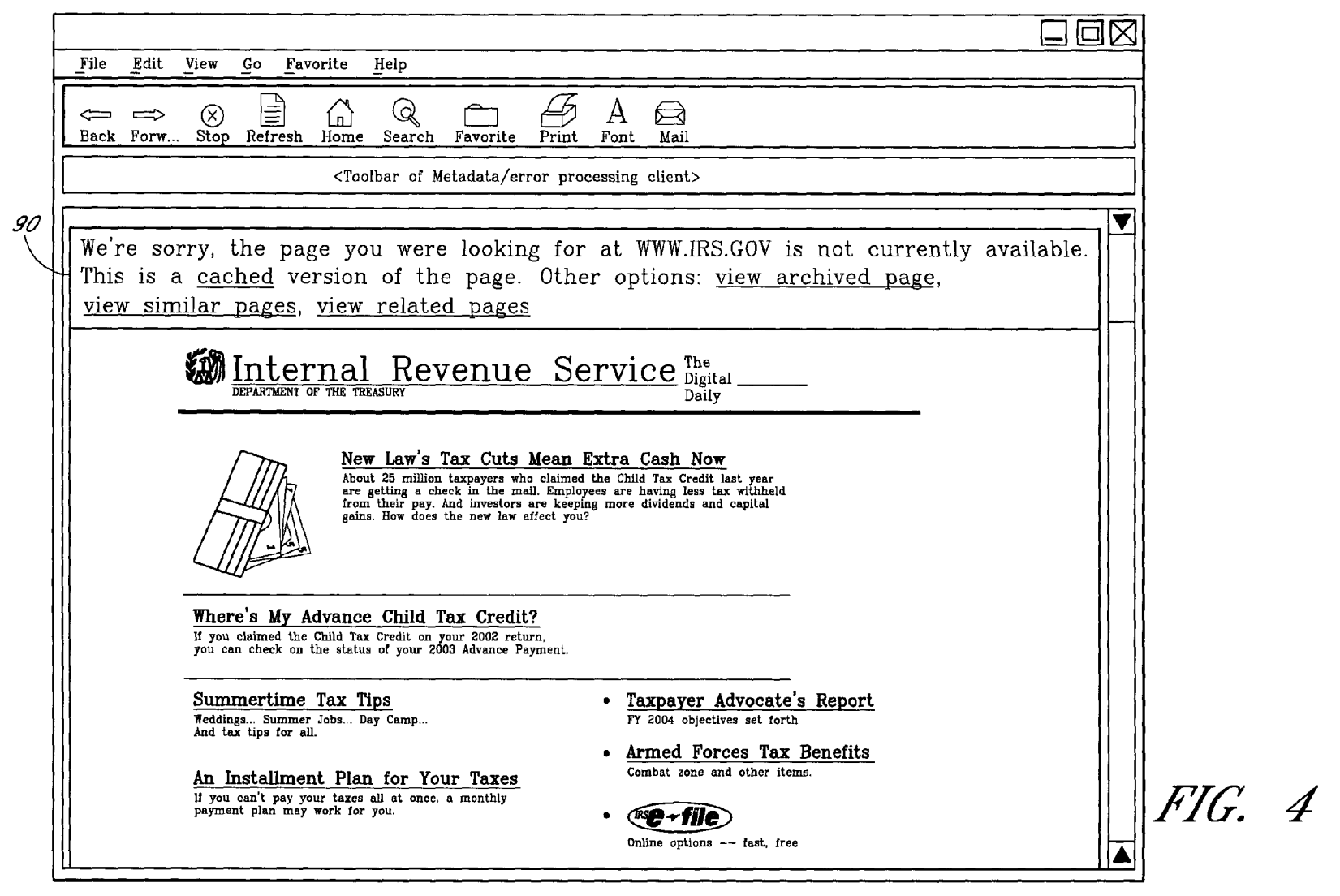

We're sorry, the page you were looking for at WWW.IRS.GOV is not currently available. This is a cached version of the page. Other options: view archived page, view similar pages, view related pages

FIG. 5

Looking for Something?

We're sorry. The Web page you requested from www.abcinc.com/index.html cannot be displayed at this time because:

[x] THERE WAS A TIMEOUT ERROR
[ ] THE PAGE COULD NOT BE LOCATED AT THIS ADDRESS
[ ] OTHER ERROR

Your Choices

| Select from Similar Pages | Get a Cached Version of this Page | Get an Archived Version of this Page | Go to a Related Page |
|---|---|---|---|
| • similar choice 1 | • Cached on 6/10/03 | • archived 4/03 | • Related Page 1 |
| • similar choice 2 | • Cached on 5/20/03 | • archived 9/02 | • Related Page 2 |
| • similar choice 3 | • Cached on 5/1/03 | • archived 1/02 | • Related Page 3 |

▶More Choices

ERROR PROCESSING METHODS FOR PROVIDING RESPONSIVE CONTENT TO A USER WHEN A PAGE LOAD ERROR OCCURS

BACKGROUND OF THE INVENTION

1. Field of the Invention

The present invention relates to techniques for handling page load errors that occur when a requested web page or other object is unavailable or otherwise cannot be properly displayed.

2. Description of the Related Art

When a user attempts to access a web page via a web browser, various types of errors can occur that prevent the page from being displayed. For example, if the page request is directed to a valid host but to an invalid URL (Uniform Resource Locator), the host may return an "error 404: page not found" error message, which may be displayed within an error page. If the page request does not produce a response from a host at the target address, the web browser may display a default message indicating that the requested page cannot be displayed, or may "hang" until the user performs some action. In addition, in some cases, the page can be retrieved, but cannot be displayed due to script execution errors, unsupported data formats, or other problems relating to the content of the requested page.

These and other forms of "page load errors" can occur for various reasons. For example, a given URL that is valid at one time may become invalid. This may occur, for example, if the operator of a particular web site moves or deletes a particular web page, or moves the entire web site to a new host address. In addition, a user may mistype a URL, or may request a web page from a host that is currently not responding. Further, a web page may contain errors, or may contain data formats that are not supported by all web browsers.

Regardless of the cause, page load errors, and errors involving requests for other types of displayable objects, can be very frustrating to users. The present invention seeks to address this problem.

SUMMARY OF THE INVENTION

The present invention provides a system and method for providing an alternate object to a Web user when a requested object cannot be displayed. The alternate object is selected or generated based at least in-part on the URL of the failed object request, and typically contains content that is relevant to the user's browsing session. The alternate object may be displayed in place of the requested object or in a separate window, and may be displayed together with a message or annotation indicating the type or source of the alternate object. One application of the invention involves displaying an alternate web page to a user when a page load error occurs.

In a preferred embodiment, the system includes a client component that runs on a user computer as part of or in conjunction with a web browser. The client component monitors requests made by the browser, and detects errors, such as but not limited to "error 404: page not found" errors, in which the requested web page or other object cannot be properly displayed. In response to detecting such an error, the client component notifies a remote error processing server, which uses the target URL of the failed request to identify, and optionally generate, an alternate object to display to the user. For example, if the error involves a request for a web page, one of the following types of alternate objects may be displayed: (a) a page retrieved from a replacement URL to which the requested page has been moved or copied, (b) a cached or archived version of the requested page, (c) a page that is related or similar to the requested page, (d) a page retrieved from a closely matching URL found in the user's clickstream history, (e) a text, PDF, or other non-HTML version of the requested page, or (f) a dynamically generated page that includes links to one or more of the foregoing types of alternate pages.

An important aspect of the system is that it operates generally independently of the manner in which the users connect to the Internet. For example, users need not connect to the Internet through a special proxy server or other intermediate system that provides error processing services.

The invention also comprises methods for identifying URLs that are substitutes, as may exist, e.g., when a web page or other object is moved or copied to a new location. One such method involves analyzing user clickstreams to identify a pair of web pages or sites that are related due to the high frequency with which users who view one also view the other. The content of the two related web pages or sites may then be compared to determine whether specific pages are substantially identical.

Neither this summary nor the following detailed description purports to define the invention. The invention is defined by the claims.

BRIEF DESCRIPTION OF THE DRAWINGS

FIG. 4 illustrates one example of a type of alternate page that may be displayed when a page load error occurs.

FIG. 5 illustrates another example of a type of alternate page that may be displayed when a page load error occurs.

DETAILED DESCRIPTION OF THE PREFERRED EMBODIMENT

For purposes of illustration, the invention will be described primarily in the context of requests for web pages. As will be recognized, the invention may also be applied to the retrieval of other types of objects and resources, such as PDF documents and image files.

Figure 1:
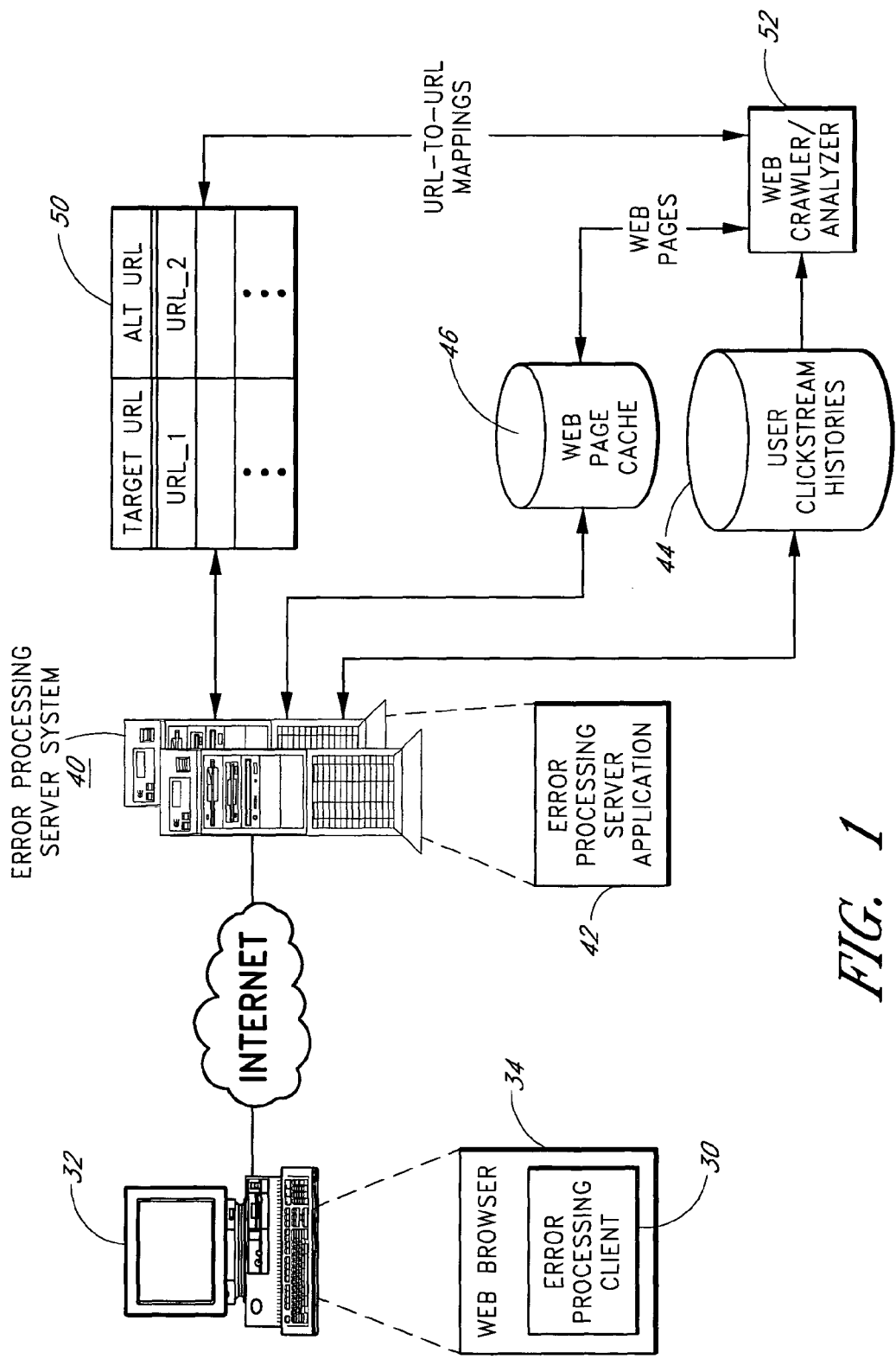
FIG. 1 illustrates a system that processes page load errors according to one embodiment of the invention.

FIG. 1 illustrates a system for handling page load errors in accordance with one embodiment of the invention. The system includes an error processing client component 30 that runs on a user computer 32, or another type of user computing device (PDA, cell phone, etc.), in conjunction with a web browser 34. The error processing client 30 may, for example, be implemented as a browser plug-in, or within the native code of the web browser 34. Alternatively, the error processing client may be a standalone component that monitors the operation of the web browser 34 and displays messages outside of the web browser. The web browser 34 need not be a standalone component, but rather may, for instance, be an integral component of an operating system.

The error processing client 30 communicates over the Internet with a remote error processing server 40, which may include one or more physical servers (two shown). The error processing server 40 runs an application 42 which is responsible generally for providing alternate web pages to users when page load errors occur. Although the error processing server 40 is depicted as communicating with a single user computer 32, the error processing server will typically provide error handling services to many user computers, all of which run a web browser 34 and an error processing client 30.

In a preferred embodiment, the error processing client 30 and server 40 additionally act generally as a metadata client and metadata server, respectively. Specifically, the error processing client 30 notifies the error processing server 40 of the URL of the web page currently being retrieved or displayed by the browser 34, and the error processing server 40 responds by returning metadata for this web page. This metadata may include, for example, site statistics and links to related web pages, and may be displayed to the user in conjunction with the web page currently being viewed. In this embodiment, the error processing server 40 also maintains a database 44 of user clickstream histories (histories of URLs accessed by specific users). Examples of systems for generating and displaying web page metadata are described, for example, in U.S. Pat. No. 6,282,548.

The error processing client 30 operates generally by monitoring page requests issued by the web browser 34 to detect page load errors. The errors detected by the error processing client may include "404—page not found" errors, timeout errors, script execution errors, errors in which the web server indicates that the requested page is no longer available, and other types of page load errors in which a requested web page cannot be properly displayed. When such an error event is detected, the error processing client 30 preferably reports the error condition to the error processing server 40, and notifies the error processing server of the target URL of the failed request. The error processing server 40 responds by using the target URL to identify, and optionally generate, an alternate object (typically an alternate web page) to display to the user. The following are examples of the types of alternate objects that may be displayed in accordance with the invention:

Web page from substitute URL: A web page retrieved from a substitute URL for the target URL may be displayed to the user. One URL may be considered a substitute for another URL if web pages that are or were previously retrievable from these URLs are substantially identical. A substitute URL may exist, for example, when a web page or site has been moved or copied to a new location. One example of a method that may be used to detect substitute URLs is described below.

Cached or archived version of requested web page: A cached or archived version of the requested web page may be presented if such a page exists within a web page cache are archive accessible to the error processing server 40.

Related or similar web page: One or more web pages that are related to, but not substitutes for, the requested web page may be presented. Typically, the related web pages come from web sites other than the site to which the target URL corresponds. Various algorithms exists for detecting web pages and web sites that are related to each other, including content-based algorithms, and algorithms that analyze the clickstream histories of users to look for web sites or pages that are commonly accessed within the same browsing session.

Web page retrieved from URL with similar spelling. In some cases, a page load error may be the result of the user mistyping the URL. To detect these types of events, the target URL entered by the user may be compared to the URLs in the user's clickstream history, and possibly to common URLs that do not exist in the user's clickstream history. If a close match is found, a web page retrieved from the closely matching URL may be presented.

Different format of requested page: A text, PDF, or other non-HTML version of the requested page may be retrieved from a database and presented to the user.

In each of the examples above, the web browser 34 may be redirected to the URL of the alternate object, or the alternate object may be retrieved or generated by the error processing server 40 and sent to the web browser. Regardless of the delivery method used, an appropriate message may be presented to the user indicating that the requested web page could not be loaded and that an alternate object is being presented. For example, as depicted in FIG. 4, if the page is retrieved from a cache, a message or annotation 90 may be added to the page to indicate that a cached version of the requested web page is being displayed. These types of messages 90 may alternatively be displayed in a separate window, frame, or toolbar area of the browser 34, or possibly outside the browser. In this example, the message 90 includes links (three shown) to other alternate objects that may be viewed in lieu of the desired web page.

Rather than displaying the alternate page to the user immediately, an intermediate page may be presented with links to one or more of the alternate objects. One example of such an intermediate page is shown in FIG. 5. A further variation is to display the links to alternate objects within a non-web-page display area generated by the error processing client 30, rather than as part of a web page. For instance, these links may be displayed within a browser toolbar area (see FIG. 5) generated by the error processing client 30.

FIG. 1 illustrates some of the server side components that may be included within a given system to identify and display alternate web pages of the type described above. One such component is a URL-to-URL mapping table 50 that maps specific URLs to URLs of alternate objects. A given target URL may be mapped by this table to one or more substitute URLs, and/or to one or more related URLs (i.e., URLs of related web pages). If both substitute and related URLs are included within the mappings, the table 50 may indicate whether or not a given alternate URL is a substitute for the particular target URL.

The task of generating the URL-to-URL mappings may be the responsibility of a web crawler/analyzer program 52 that analyses and compares web pages, and possibly other types of web objects, to identify pairs of URLs that are substitutes or are otherwise related. As illustrated in FIG. 1, the web crawler/analyzer 52 may also evaluate user clickstreams as part of this process. For instance, the web crawler/analyzer 52 may initially analyze the clickstreams of many users to identify specific URLs or web sites that are frequently viewed in combination (e.g., during the same browsing session). These URLs or web sites may initially be treated as "related." For example, URL1 (or web site 1) may initially be treated as being related to URL2 (or web site 2) if a significant portion of those who accessed one also accessed the other. Various other methods for identifying related URLs may additionally or alternatively be used, including methods that rely on the existence of links between web pages as a basis for measuring web page relatedness. Examples of methods that may be used to identify related URLs are described in the following U.S. patent documents: US Patent Pub. 2003/0074369 A1; U.S. Pat. No. 6,182,091;

U.S. Pat. No. 5,895,470, and Dean et al, "Finding Related Pages in the World Wide Web," Elsevier Science B.V., 1999.

Once a pair of related URLs or sites has been identified, the web crawler/analyzer 52 may compare the visible content of the objects retrieved from these URLs, and treat the two URLs as substitutes or duplicates if the visible content is substantially identical. Depending upon the outcome of this comparison, a given pair of URLs may be listed in the table 50 either as being "related" or as being "substitutes." Certain types of objects may be ignored or excluded, such as empty documents and default Apache installation pages.

Substitute URLs may also be identified based on redirect messages. For example, the web crawler/analyzer 52 may treat d1.com and d2.com as substitutes if a request for d1.com returns a redirect to d2.com. In addition, feedback from users may be used to identify related and/or substitute URLs. For example, a mechanism may be provided for allowing users of the error processing client 30 to explicitly indicate that a given web page or site has moved to a new location. The methods described in U.S. Pat. No. 6,138,113 may also be used.

As depicted in FIG. 1, some of the web pages retrieved and analyzed by the web crawler/analyzer 52 may be stored in a web page cache 46. Web pages may be selected to include in the cache 46 based on the frequencies with which the associated URLs appear within the clickstream histories of users, or based on any other appropriate criteria. As mentioned above, the web page cache 46 may be used to return a cached version of a web page that is currently undisplayable. Further, cached versions of web pages may optionally be used to identify web pages that have been moved. For instance, the web crawler/analyzer 52 could compare the web page retrieved from a newly discovered URL with a cached version of a page retrieved from a currently non-responsive URL to evaluate whether the new URL replaces (is a substitute for) the non-responsive URL. Selected web pages may also be stored persistently within an archive (not shown) that is accessible to the error processing server 30.

As will be recognized, the present invention may be implemented using only a subset of those components and functions described above. For example, the alternate objects may be provided exclusively from the web page cache 46 or an archive, or based exclusively on data stored in the URL-to-URL mapping table 50. Further, components and methods other than those described herein may be used to identify and/or generate the alternate web pages.

Figure 2:
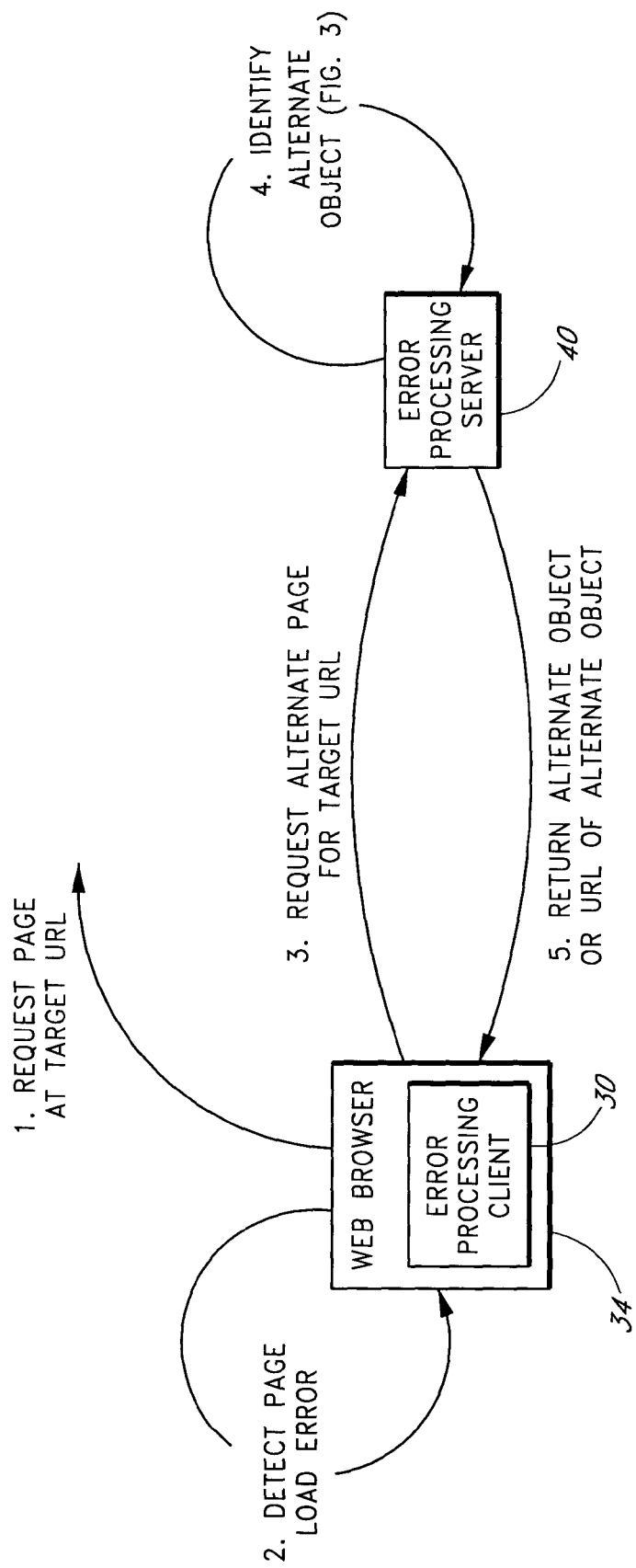
FIG. 2 illustrates a sequence of interactions that may occur between a web browser and the error processing server of FIG. 1 to handle a page load error.

FIG. 2 illustrates a typical sequence of interactions that may occur in the preferred embodiment when a page request results in a page load error. The page request (event 1) may be a request for a web page, or possibly another type of object, at any target URL. The error processing client 30 may detect the error (event 2) by monitoring the content of server responses received by the browser (e.g., to look for predefined error messages, and to look for predefined strings such as "404," "error," "page not found," and "unable to display" in returned web pages). The error processing client may also treat a web server's failure to respond within a fixed or user-configurable timeout period as a page load error. Further, the error processing client may monitor error messages generated by the web browser 34 to detect page load errors.

Upon detecting a page load error, the error processing client 30 causes the web browser 34 to send a request to the error processing server 40 for an alternate object for the target URL (event 3). This request may, in some embodiments, be sent to the error processing server 40 before the error processing client actually detects the error, so that the alternate object may be displayed promptly upon actual detection of the error. The request for the alternate page may optionally specify the type of error detected (e.g., 404, timeout, etc.), in which case the error processing server may take the error type into consideration in selecting a type of alternate page to present. In response to the request, the error processing server 40 selects an alternate object to present to the user (event 4), and in some embodiments, generates the selected alternate object. One example of a method that may be used to perform this task is shown in FIG. 3, discussed below.

The error processing server 40 then returns the alternate object, or the URL of the alternate object, to the web browser 34 (event 5). The web browser 34 may display the alternate object in a main browsing window, or in a window or other area that is separate from the main window (e.g., a separate pop-up window).

If the alternate object is retrieved as the result of a timeout error, and the actual page requested by the user thereafter begins to arrive, the display of the alternate object may be automatically replaced with a display of the requested page. To increase the likelihood that the requested page will be displayed in this manner, a background task of the error processing client 30 may periodically attempt to retrieve the requested page while the user views the alternate object.

Figure 3:
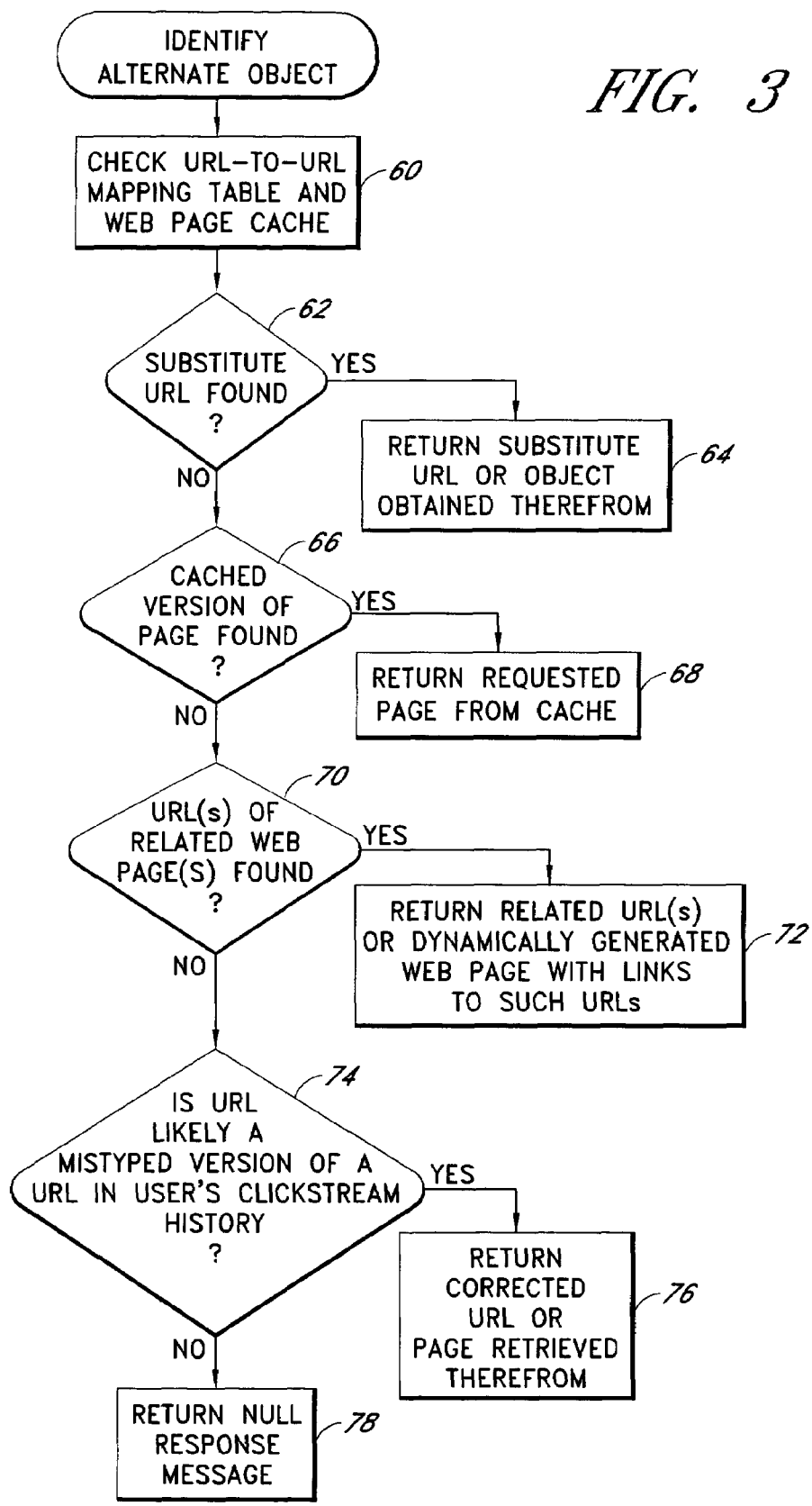
FIG. 3 illustrates on example of a process that may be used by the error processing server of FIG. 1 to identify or generate an alternate object for the URL of a failed page request.

FIG. 3 illustrates one example of a method that may be used by the error processing server application 42 to identify, and in some cases generate, an alternate page or other object in the system of FIG. 1. Initially, the URL-to-URL mapping table and the cache 46 are checked to see if any entries exist for the target URL (block 60). If a substitute URL is found in the table (block 62), the substitute URL, or an object retrieved by the error processing server 40 from the substitute URL, is returned to the web browser (block 64). If no substitute URL is found but a cached version of the requested page exists (block 66), the cached version of the requested page is returned (block 68). If a cached version of the page is not found in block 66, but one or more related URLs are listed in the mapping table (block 70), the related URL(s) may be returned, optionally as part of a dynamically-generated web page that includes a separate link for each such related URL (block 72).

If no related URLs are listed for the target URL, the error processing server 40 may compare the target URL to URLs contained in the user's clickstream history (block 74) to determine whether any close matches exists. If a closely matching URL is found (e.g., one that differs from the target URL by only a single character), the browser 34 may be redirected to this closely matching URL, or otherwise caused to display an object retrieved from that URL (block 76). Finally, if no alternate object can be identified for the target URL, the error processing server 40 may return a null response (block 78), or possibly a default error page.

Once the alternate object or its URL is communicated to the browser 34, the browser displays the alternate object to the user. FIG. 4 illustrates the general form of an alternate object that may be displayed to the user. As mentioned above, an appropriate annotation 90 may be added to the alternate object, or otherwise displayed within or outside the browser 34, to indicate the type or source of the alternate object. A menu may also be displayed on the alternate object within or outside of the browser 34 to allow the user to select a different alternate object to view.

Rather than selecting an appropriate type of alternate object to present to the user as in FIG. 3, an intermediate page (which is itself an alternate page) may be presented with links to alternate objects of various types. For example, an intermediate page can be presented with a link to each substitute web page, a link to a cached version of the requested page, and/or a link to each related page. FIG. 5 illustrates the general form of an intermediate page that is displayed in one embodiment.

The method shown in FIG. 3 embodies a particular hierarchy of types of alternate objects to be displayed. For example, a cached version of the requested page is displayed only if no substitute URL is found; and related URLs are returned only if no substitute or cached version of the requested page is found. Each user of the system may be permitted to specify or modify this hierarchy to specify how alternate objects are to be selected for display. For instance, a user may be permitted to filter out certain types of alternate objects, or to specify that a particular type of alternate object should be displayed if available.

The foregoing methods and components may also be used to handle errors that occur when display objects other than web pages are requested. For example, when a browser 34 attempts to retrieve an image file from a particular URL, an alternate image file may be identified by the error processing server, and displayed within the browser, using the same techniques as described above. As another example, when a user requests a PDF document that is not found, the error processing server 40 may return an HTML version of the requested document or a link thereto.

Further, the division of functionality between the error processing client and server components may be varied from that shown and described above. For instance, some or all of the entries in the URL-to-URL mapping table 50 (FIG. 1) can be periodically transmitted to and cached by each client computer 32. In such embodiments, the error processing client 30 may look up an alternate URL from its locally-stored table, and retrieve an alternate object from that URL, without communicating with the error processing server 40.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims.

What is claimed is:

1. A system for handling page request errors, comprising:
   an error processing server; and
   a client component that runs on a user computing device in association with or as part of a browser program and communicates with the error processing server over a computer network;
   wherein the client component is responsive to detection of the unavailability of a target web page requested by the browser program by sending a request to the error processing server, and the error processing server is responsive to the request by using an address of the target web page to select an alternate object to be displayed by the browser program in place of the requested target web page, wherein the error processing server is capable of selecting the alternate object according to a hierarchy of alternate object types such that selection priority is given to a first type of alternate object over at least a second type of alternate object, said hierarchy specified by a user of the user computing device, and specifying selection priorities for at least the following types of alternate objects: (a) a substitute object which is an object previously determined to have visible content that is substantially identical to visible content of the target web pages (b) a cached version of the target web page, and (c) a non-cached web page that is related to the target web page but is not a substitute object;
   whereby the system enables an alternate object that is associated with the requested web page to be presented to the user when the requested web page is unavailable.

2. The system of claim 1, wherein the error processing server is capable of checking a plurality of different sources to identify an alternate object, each source corresponding to a different type of alternate object.

3. The system of claim 1, wherein the error processing server further causes the browser program to display a message indicating the type of the alternate object selected for display.

4. The system of claim 1, wherein the error processing server accesses a table that maps specific URLs to URLs of alternate objects, and uses the table to select at least some of the alternate objects to present to users.

5. The system of claim 4, wherein the table maps URLs to substitute URLs.

6. The system of claim 4, wherein the table maps URLs to related URLs.

7. The system of claim 4, further comprising an analysis component that analyzes clickstreams of users and associated web pages to generate URL-to-URL mappings included within the table.

8. The system of claim 1, wherein the error processing server compares a target URL supplied by a user to URLs contained within a clickstream of the user to evaluate whether the user mis-entered the target URL.

9. The system of claim 1, wherein the error processing server additionally generates at least some of the selected alternate objects.

10. The system of claim 1, wherein the client component requests an alternate object from the error processing server in response to detecting at least an HTTP 404 error.

11. The system of claim 1, wherein the client component requests an alternate object from the error processing server in response to detecting at least a timeout error.

12. The system of claim 1, wherein the client component is a browser plug-in.

13. The system of claim 1, wherein the hierarchy additionally specifies a selection priority for the following type of alternate object: (d) an object obtained from a similarly but differently spelled URL in a clickstream history associated with the browser program.

14. The system of claim 1, wherein the first type of alternate object is a substitute object, and the second type of object is a cached version of the target web page.

15. The system of claim 1, wherein the first type of alternate object is a substitute object and the second type of alternate object is a related web page that is not a substitute object.

16. The system of claim 1, wherein the first type of alternate object is a cached version of the target web page, and the second type of alternate object is a non-cached web page determined to be related to the target web page.

17. The system of claim 1, wherein the error processing server is configured to check for the first type of alternate object, and to return the second type of alternate object only if the first type of alternate object is not available.

18. The system of claim 1, wherein the system enables each user to specify the hierarchy to control how alternate objects are selected for display.

19. The system of claim 1, wherein the system enables an end user to specify that a particular type of alternate object should not be displayed.

20. The system of claim 1, wherein the address of the target web page is a URL.

21. The system of claim 1, wherein the client component is configured to generate HTTP requests.

22. A computer-implemented method of handling page load errors, comprising:

detecting, at a user computing device that runs a web browser, that a browser request for a target web page has resulted in an error of a defined type;

transmitting an address of the target web page from the user computing device to an error processing server;

at the error processing server, using the address of the target web page to select an alternate web page to display within the browser, wherein the error processing server selects the alternate web page using a hierarchy that specifies a preference for a first type of alternate web page over at least a second type of alternate web page, said hierarchy specified by a user of the user computing device, and reflecting relative preferences of the user for at least the following types of alternate web pages: (a) a substitute web page which is a web page determined to have visible content that is substantially identical to visible content of the target web page, (b) a cached version of the target web page, and (c) a non-cached web page that is related to the target web page but is not a substitute web page; and causing the web browser to display the alternate web page in place of the requested target web page.

23. The method of claim 22, wherein the hierarchy additionally specifies a relative preference for the following type of alternate web page: (d) a web page obtained from a similarly but differently spelled URL in a clickstream history associated with the user computing device.

24. The method of claim 22, wherein the method comprises the error processing server selecting a secondary type of alternate web page to display within the browser in response to detecting that a primary type of alternate web page is not available.

25. The method of claim 22, further comprising displaying a message within the web browser indicating which of said types of alternate web pages was selected for display.

26. The method of claim 22, wherein the error of a defined type is an HTTP 404 error.

27. The method of claim 22, wherein the method comprises the error processing server selecting a cached version of the target web page to display in response to determining that no substitute web page is known for the target web page.

28. The method of claim 22, wherein the first type of alternate web page is a web page retrieved from a URL that is deemed to be a replacement URL for the target web page.

29. The method of claim 22, wherein the step of using the address of the target web page to select an alternate web page comprises accessing a URL-to-URL mapping table that separately maps each of a plurality of target URLs to a URL of an alternate web page.

30. The method of claim 22, wherein the step of using the address of the target web page to select an alternate web page comprises comparing a target URL supplied by a user to URLs contained in a clickstream history of the user to evaluate whether the user mis-entered the target URL.

31. The method of claim 22, wherein the alternate web page is generated dynamically by the error processing server.

32. The method of claim 31, wherein the dynamically-generated web page includes links to pages that are at least related to the target web page.

33. The method of claim 22, wherein the hierarchy specifies a type of alternate object that is not to be selected for display by the error processing server.

34. A method of handling errors associated with browser requests for displayable objects, the method comprising:

detecting, at a user computing device that runs a web browser, that a browser request for a target object at a target URL has resulted in an error of a defined type;

looking up an alternate URL based at least in-part on the target URL, said alternate URL specifying a location of an alternate object, said alternate object not being an archived version of the target object, wherein looking up the alternate URL comprises using a hierarchy of alternate object types to select the alternate URL, said hierarchy of alternate object types specifying a preference for a first alternate object type over at least a second alternate object type, wherein the hierarchy is specified by a user of the user computing device, and reflects relative preferences of the user for at least three of the following alternate object types: (a) a substitute object which is an object determined to have visible content that is substantially identical to visible content of the target object, (b) a cached version of the target object, (c) a non-cached object that is related to the target object but is not a substitute object, (d) an object obtained from a similarly spelled URL present in a clickstream history associated with the user computing device; and responding to the error by doing at least one of the following (1) retrieving the alternate object from the alternate URL and displaying the alternate object within the web browser, (2) presenting, on the user computing device, a link to the alternate object to allow a user to select the alternate object for display.

35. The method of claim 34, wherein the hierarchy reflects relative preferences of the user for all four of said alternate object types, (a), (b), (c) and (d).

36. The method of claim 34, wherein the method comprises retrieving the alternate object, and displaying the alternate object within the web browser together with a message indicating which of said types of alternate objects is displayed.

37. The method of claim 34, wherein the error of a defined type is an HTTP 404 error.

38. The method of claim 34, wherein the error of a defined type is a timeout error in which a host of the target object fails to respond to the browser request within a selected time period.

39. The method of claim 34, wherein the method comprises determining whether a substitute URL is known for the target URL, and when no substitute URL is known, using a cached version of the target object as the alternate object.

40. The method of claim 34, wherein the method comprises giving preference to a cached version of the target object over a web page that is related to, but not a cached version of, the target object.

41. The method of claim 34, wherein the step of looking up an alternate URL comprises accessing a URL-to-URL mapping table that separately maps each of a plurality of URLs to a URL of a corresponding alternate object.

42. The method of claim 41, wherein the step of accessing the URL-to-URL mapping table comprises accessing a cached version of the table stored on the user computing device.

43. The method of claim 34, wherein the step of looking up an alternate URL is performed by a remote error processing server in response to a message received from the user computing device.

44. The method of claim 34, further comprising receiving an indication of said hierarchy from the user.

* * * * *

UNITED STATES PATENT AND TRADEMARK OFFICE
CERTIFICATE OF CORRECTION

PATENT NO. : 7,325,045 B1 Page 1 of 1
APPLICATION NO. : 10/634633
DATED : January 29, 2008
INVENTOR(S) : Manber et al.

It is certified that error appears in the above-identified patent and that said Letters Patent is hereby corrected as shown below:

At column 7, line 67, delete "object which" and insert --object, which--.

At column 8, line 2, delete "pages" and insert --page,--.

At column 9, line 24, after "page" insert --,--.

At column 10, line 24, delete "object which" and insert --object, which--.

At column 10, line 40, delete "(b," and insert --(b),--.

Signed and Sealed this

Tenth Day of June, 2008

JON W. DUDAS
*Director of the United States Patent and Trademark Office*